United States Patent [19]
Frerichs et al.

[11] Patent Number: 6,052,952
[45] Date of Patent: Apr. 25, 2000

[54] FLAT FLOOR ROOM EXTENSION

[75] Inventors: Marc Edward Frerichs, Davenport; Paul Edmund Hanser, Tipton, both of Iowa

[73] Assignee: HWH Corporation, Moscow, Iowa

[21] Appl. No.: 09/259,371

[22] Filed: Feb. 26, 1999

[51] Int. Cl.$^7$ ...................................................... E04B 1/346
[52] U.S. Cl. ...................................................... 52/64; 52/67
[58] Field of Search ................................... 52/64, 67, 71, 52/72

[56] References Cited

U.S. PATENT DOCUMENTS

| | | | |
|---|---|---|---|
| 2,857,197 | 10/1958 | Hogg | 52/64 |
| 2,858,581 | 11/1958 | Doane | 52/64 |
| 5,054,295 | 10/1991 | Goulooze | 62/239 |
| 5,333,420 | 8/1994 | Eden | 52/67 |
| 5,345,730 | 9/1994 | Jurgensen | 52/64 |
| 5,365,704 | 11/1994 | Ray | 52/64 |
| 5,491,933 | 2/1996 | Miller et al. . | |

*Primary Examiner*—Carl D. Friedman
*Assistant Examiner*—Jennifer I. Thissell
*Attorney, Agent, or Firm*—James C. Nemmers

[57] ABSTRACT

A system for extending and retracting moveable rooms that expand the useable living space in recreational vehicles and the like. The system includes a pair of hydraulic extension cylinders positioned within the main structural members, each hydraulic extension cylinder powering a double tube arrangement which is combined with a rail assembly. When in the fully retracted position, the moveable floor rests on the stationary floor and is locked in position by a mechanical catch that locks the outer tube of the dual tube arrangement with the rail assembly. When the room is to be extended, the inner tube is advanced under power of the hydraulic cylinders moving the floor outwardly while maintaining it at the same level above the stationary floor. As the inner end of the moveable floor approaches its final position but before lowering, the rear or inner edge of the moveable floor engages a floor support tube that is attached to the outer tube of the dual tube arrangement. At this time, the outer tube begins moving outwardly along with the inner tube with the moveable floor being supported on the floor support tube. At this time, the catch that previously locked the outer tube to the rail assembly pivots to unlock the outer tube from the rail assembly and to lock the inner and outer tubes together, thus allowing them to move as a unit relative to the rail assembly. Rail bearings attached to the outer tube slide down inclined ramps on the rail assembly thereby permitting the cylinders to swing the inner and outer tubes downwardly until the moveable floor is level with the stationary floor.

6 Claims, 3 Drawing Sheets

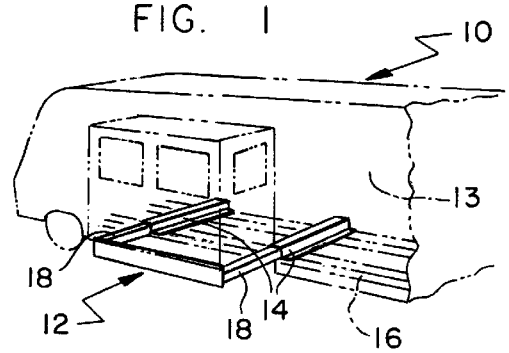
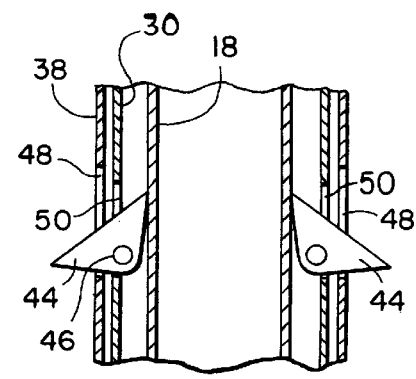
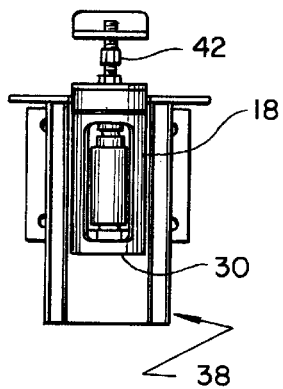
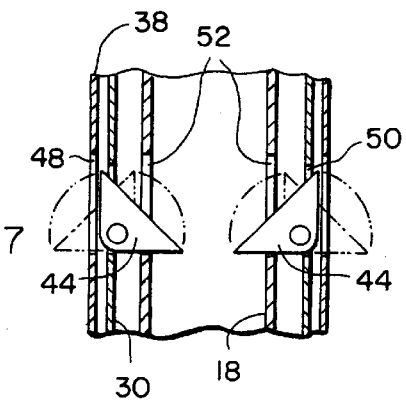
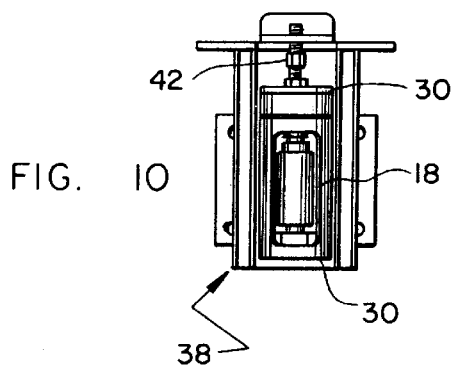
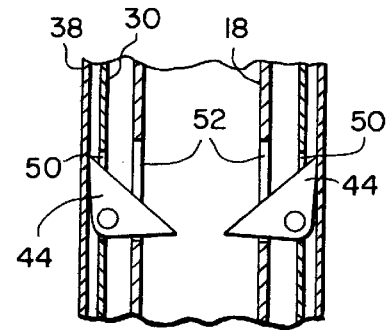
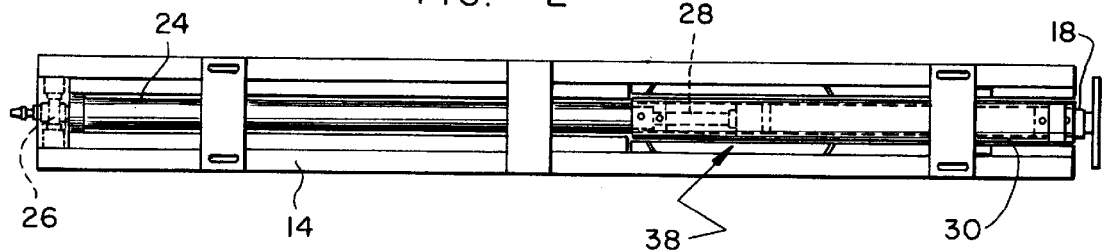

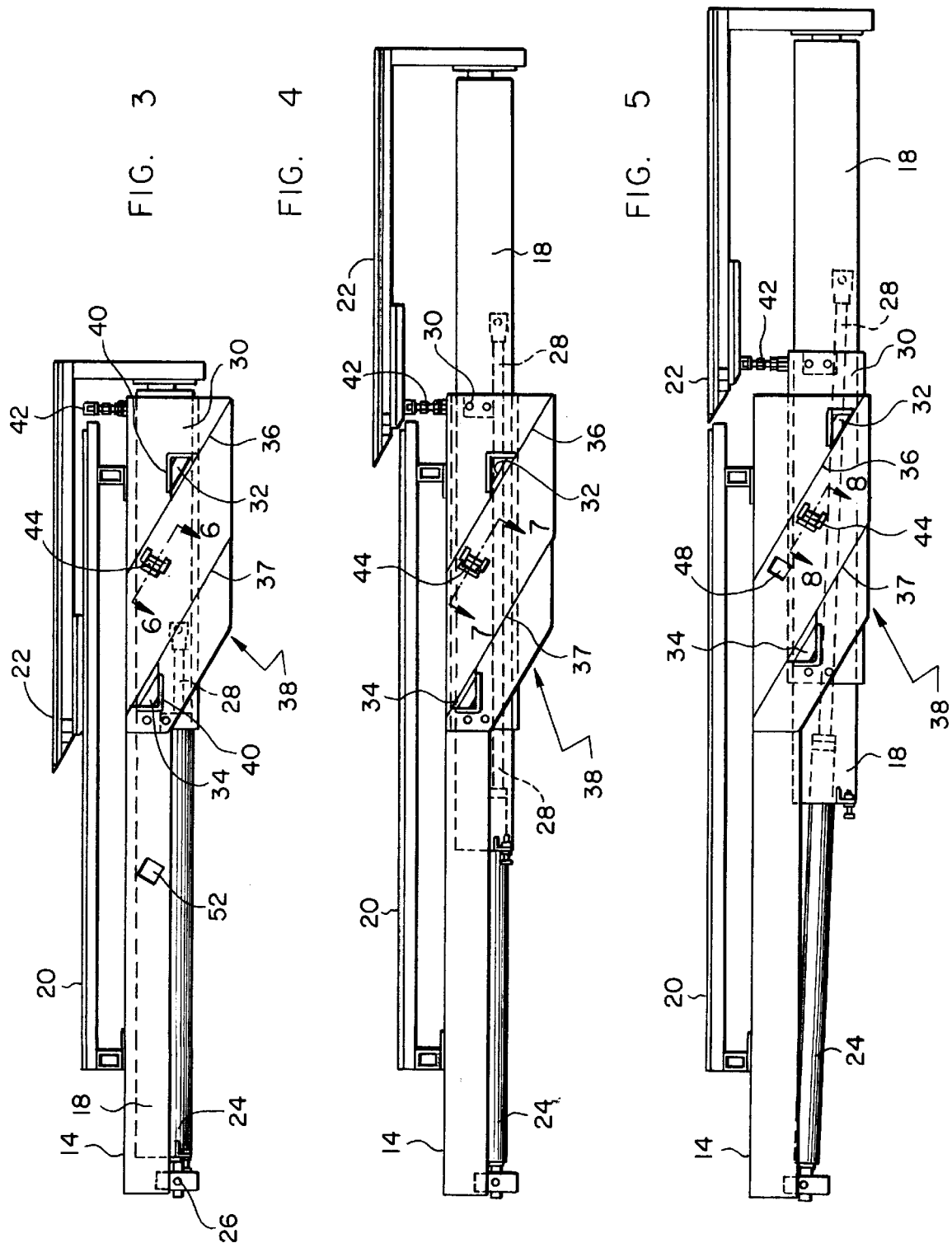

FLAT FLOOR ROOM EXTENSION

BACKGROUND OF THE INVENTION

The invention relates to expandable rooms for habitable structures, especially room structures that are telescopically slideable between retracted and expanded positions for motorized or towed vehicles.

A variety of vehicles are known and used which have a room or a room portion that may be moved from a retracted position while the vehicle is moving over the road and then expanded when the vehicle is stationary in order to provide additional internal space. This type of an arrangement provides adequate space to accommodate users in transit while still keeping the vehicle within governmental regulations that impose width limitations for vehicles on roads and highways. When these vehicles are stationary, they are frequently used for habitation for extended periods of time, and when so used, it is highly desirable to be able to maximize the available living space. This is done in a variety of ways in which the user can move the nested portion of the room out to its expanded position, typically under hydraulic of electrical power.

These expandable room portions usually include a floor, a roof, a side wall, and one or more end walls. In the retracted position, the roof, floor and end walls are typically concealed from exterior view and the room side wall forms a portion of the vehicle side wall. At the same time, the floor of the moveable portion typically rests above the floor of that portion of the room which always remains fixed, and may form a useable portion of the interior flooring during vehicle transit. Since vehicles of this type are used most of the time when stationary with the moveable room in the expanded position, it is highly desirable to eliminate the step up that would be required into the moveable room at the place where the floor of the moveable room joins the floor of the fixed room of the vehicle. The step up to the higher floor of the moveable room from the fixed room is not only inconvenient but also can be somewhat hazardous. In addition, the difference in height between the expanded room and the fixed room restricts movement of furniture within the room and makes it more difficult to create an aesthetically pleasing interior.

The prior art does teach arrangements which allow the floor sections to be at the same height in the expanded position. Many of these structures are complex and so therefore relatively expensive and may be unduly heavy. The additional weight also adversely affects the fuel economy of the vehicle. With the highly competitive market in these recreational vehicles, cost and reliability of operation are important factors.

Some of the prior art structures, although more simplified, have mechanisms that take up space beneath the floor, and when the room is in the retracted position, otherwise available storage space between the floor of the moveable room and the fixed floor is lost An additional difficulty with the expandable rooms is to provide a reliable system that will not adversely affect the weather sealing that is a necessary component around the opening through which the expandable room moves. In an attempt to provide the advantages of a flush floor when the room is expanded, some prior art systems can damage the weather sealing strips when the expandable room is moved downwardly so that it will be flush when in the fully expanded position. In addition, adequate strength of the supporting structures and proper alignment of the rooms is essential to prevent sagging of the room when in the expanded position and to make certain that no misalignment occurs which will adversely affect the sealing integrity between the moveable room and the fixed portions of the vehicle.

It is therefore an object of the invention to provide an improved expandable room structure for vehicles that is relatively inexpensive to manufacture, reliable in use, and which will provide for a flush floor in the expanded position.

SUMMARY OF THE INVENTION

The system of the invention includes a pair of hydraulic extension cylinders positioned within the main structural members, each hydraulic extension cylinder powering a double tube arrangement which is combined with a rail assembly. When in the fully retracted position, the moveable floor rests on the stationary floor and is locked in position by a mechanical catch that locks the outer tube of the dual tube arrangement with the rail assembly. When the room is to be extended, the inner tube is advanced under power of the hydraulic cylinder moving the floor outwardly while maintaining it at the same level above the stationary floor. As the inner end of the moveable floor approaches its final position but before lowering, the rear or inner edge of the moveable floor engages a floor support tube that is attached to the outer tube of the dual tube arrangement. At this time, the outer tube begins moving outwardly along with the inner tube with the moveable floor being supported on the floor support tube. At this time, the catch that previously locked the outer tube to the rail assembly pivots to unlock the outer tube from the rail assembly and to lock the inner and outer tubes together, thus allowing them to move as a unit relative to the rail assembly. Rail bearings attached to the outer tube slide down inclined ramps on the rail assembly thereby permitting the cylinders to swing the inner and outer tubes downwardly until the moveable floor is level with the stationary floor. When the room is to be retracted, the foregoing steps are reversed. The hydraulic system includes a synchronizing cylinder to assure smooth and coordinated movement between the two hydraulic cylinders. This eliminates the need for any cross shaft or other mechanism tying the two extension mechanisms together. With the system to of the invention, the moveable floor never engages the stationary floor at its outer end until it is moved downwardly into place in a position level with the stationary floor.

BRIEF DESCRIPTION OF THE DRAWING

FIG. 1 is a perspective view of a representation of a recreational vehicle with an expandable room showing the room in the expanded position;

FIG. 2 is a top or plan view with the floor removed to show one of the two hydraulic mechanisms and supporting structure for expanding and retracting the room;

FIG. 3 is a side or elevational view of the mechanism of FIG. 2 showing the moveable floor in the fully retracted position;

FIG. 4 is a side or elevational view similar to FIG. 3 but showing the moveable room in an extended position just before the moveable floor starts being lowered;

FIG. 5 is a side or elevational view similar to FIGS. 3 and 4, but showing the moveable floor in a fully extended position flush with the stationary floor;

FIG. 6 is a sectional view taken on the line 6—6 of FIG. 3 to show the catch mechanism;

FIG. 7 is a sectional view taken on the line 7—7 of FIG. 4 showing the catch mechanism at the point just prior to lowering of the moveable room;

FIG. 8 is a sectional view taken on the line 8—8 of FIG. 5 and showing the catch mechanism when the moveable room is fully extended;

FIG. 9 is an end elevational view of the mechanism of FIG. 3 with the room in a fully retracted position;

FIG. 10 is an end elevational view similar to FIG. 9 but showing the mechanism when the room is in a fully extended position;

DESCRIPTION OF THE PREFERRED EMBODIMENT OF THE INVENTION

Figure 11:
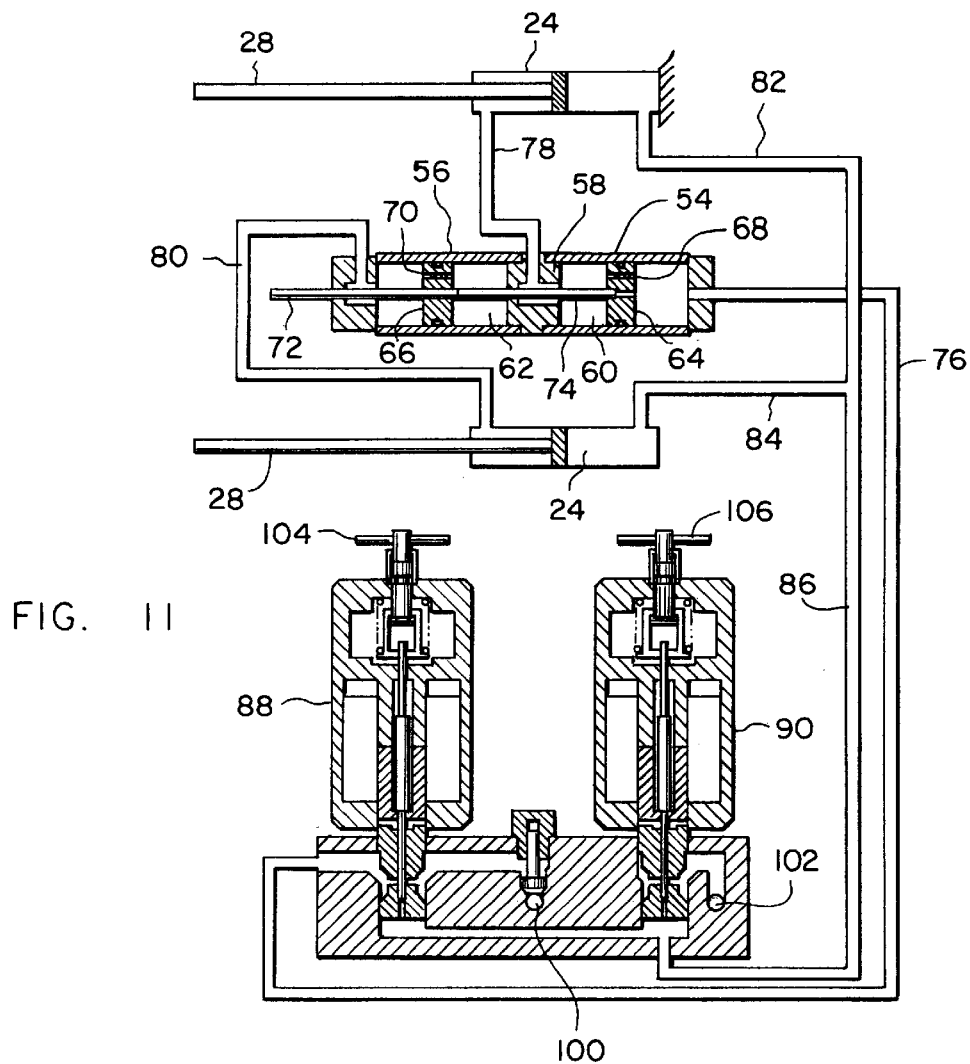
FIG. 11 is a schematic diagram of the hydraulic system of the invention.

Referring first to FIG. 1, there is illustrated a motor vehicle such as a recreational vehicle 10 that has extending from its left side an expandable room indicated generally by the reference numeral 12. FIG. 1 shows the expandable room in its extended position to provide additional living space inside of the recreational vehicle when the vehicle is stationary, such as at a campsite. As is well known to those skilled in the art, when the vehicle is traveling over the road, the expandable room 12 is retracted so that the side wall of the expandable room 12 is flush with an exterior wall 13 of the recreational vehicle 10. As shown in FIG. 1, the expandable room 12 is supported by a pair of main support beams 14 that are affixed to the frame 16 of the recreational vehicle 10 and thus are fixed relative to the expandable room 12. A moveable inner tube 18 is mounted on each of the main support beams 14 for movement inwardly to a retracted position and outwardly to an expanded position, the inner tubes 18 having their outer ends affixed to the expandable room 12. As best seen in FIGS. 3, 4 and 5, the main support beams 14 are located beneath the floor 20 of the recreational vehicle and assist in supporting that floor.

Referring now to FIGS. 3 through 10, the expandable room 12 includes a moveable floor 22 that in the retracted position shown in FIG. 3 rests on top of the floor 20 of the recreational vehicle 10. FIGS. 3, 4 and 5 illustrate three positions of the moveable floor 22 relative to the floor 20, FIG. 3 showing the moveable floor in the fully retracted position while FIG. 5 shows the moveable floor in the fully extended position. FIG. 4 shows the moveable floor 22 in a position just before it is lowered to become level with the fixed floor 20 as explained more fully hereinafter.

As indicated above, there are two main support beams 14 that are spaced apart the approximate width of the expandable room 12, the beams 14 being parallel to each other and in the same horizontal plane. FIGS. 2, 3, 4 and 5 show only one of the beams 14 with the associated mechanism for expanding and retracting the room. It will be understood, however, that each of the beams 14 has substantially the identical structure. Therefore, only one of the beams 14 with the associated mechanism will now be described.

A hydraulic cylinder 24 is mounted by a horizontal pivot pin 26 to the inner end of the main support beam 14. This structure allows the hydraulic cylinder 24 to swing upwardly and downwardly in a vertical plane about the pivot pin 26. The operating rod 28 of the hydraulic cylinder 24 has its outer end connected to the inner tube 18. The inner tube 18 is slideably mounted and moveable relative to an outer tube 30 to which are attached a pair of rail bearings, one such bearing 32 being affixed to the outer tube 30 near its outer end while the other bearing 34 is affixed to the outer tube 30 near its inner end. The outer tube has a pair of bearings 32 and 34 on each of its sides so that the bearings 32 and 34 are slideably engageable with inclined ramps 36 and 37 that are affixed on each side of the inner surface of a hollow rail assembly 38. FIGS. 3, 4 and 5 are side elevational views, but for purposes of illustration, one side of the rail assembly 38 has been removed to illustrate in full lines the ramps 36 and 37. As shown in FIGS. 3, 4 and 5, the outer bearing 32 rests on top of the inclined ramp 36 while the bearing 34 that is attached to the outer tube 30 near its inner end is engaged with the under surface of the ramp 37. The rail assembly 38 is fixed to the main supporting structure of the vehicle, and since the inner tube 18 and outer tube 30 are supported by the hydraulic cylinder 24, the force of gravity will force the bearing 32 onto the top surface of inclined ramp 36 and the bearing 34 against the under surface of the other ramp 37. The bearings are preferably made of a suitable low friction material and are mounted on L-shaped supports 40 which are welded or otherwise suitably affixed to the outside surfaces of the outer tube 30.

At the outer end of the outer tube 30 a floor support tube 42 extends vertically so that the top of the floor support tube is approximately at the level of the fixed floor 20. The outer tube 30 also has attached to it a triangular shaped locking catch 44, there being one such catch 44 on each side of the outer tube 30 as best seen in FIGS. 6, 7 and 8. Each of the locking catches 44 is mounted on a pivot pin 46, the axis of which is at a right angle to the inclined ramps 36 and 37 and the rail assembly 38 has formed in each of its sides an opening 48 into which one corner of the catch 44 extends when the moveable floor 22 is in the fully retracted position of FIG. 3. Tis position of the catches 44 is shown in FIG. 6. Each side of the outer tube 30 contains an opening 50 that is large enough to permit the corners of the catch 44 to swing through them. This is illustrated by the dotted lines in FIG. 7. Thus, in the fully retracted position, the outer tube 30 and rail assembly 38 are locked together by the catches 44.

Catches 44 are biased inwardly as shown in FIG. 6 due to the forces exerted by the weight of the structure and the fact that the catches are mounted at an angle to the horizontal. When the hydraulic cylinder 24 is actuated and the actuating rod 28 therefor moves outwardly to move the moveable floor 22 outwardly toward its fully extended position, the outer tube 30 will remain stationary being locked to the rail assembly 38 by the catches 44. However, as the inner tube 18 continues to move outwardly, an opening 52 formed in each side of the inner tube 18 will approach the inner corner of the respective catch 44. When the openings 52 are engaged by the catches 44, the catches 44 will pivot into the openings 52 and be pivoted to the position shown in FIG. 7 in which the catches 44 no longer are engaged in the openings 48 of the rail assembly 38, but are now engaged so as to lock the outer tube 30 to the inner tube 18. Locking of the inner tube 18 and the outer tube 30 occurs when the moveable floor 22 is in the position illustrated in FIG. 4 where the floor support tube 42 is now engaged with the moveable floor 22 and the moveable floor 22 is approaching its fully extended position. At this time, with the catches 44 locking together the inner tube 18 and outer tube 30, the outer tube 30 now moves outwardly with the inner tube 18, and as it does, the bearings 32 and 34 move down the inclined ramps 36 and 37 carrying the inner tube 18 downwardly. At the time that the operating rod 28 of the hydraulic cylinder 24 has fully extended the inner tube 18, the bearings 32 will be at the bottom of the inclined ramp 36 of the rail assembly 38 and the moveable floor 22 will now be level with the fixed floor 20 and in the position shown in FIG. 5. This action allows the moveable floor 22 to move outwardly and then downwardly without contacting the outside edge of the fixed floor 20 which contact can damage the seal typically located in that area of the opening in the vehicle sidewall.

Figure 12:
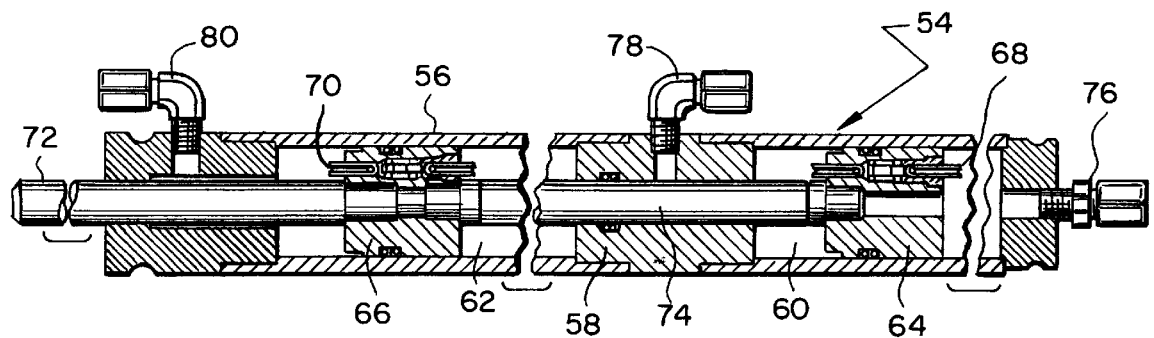
FIG. 12 is a longitudinal sectional view of the synchronizing cylinder that forms a part of the hydraulic system.

Referring now to FIGS. 11 and 12, there is shown a schematic flow diagram for a portion of the hydraulic system that incorporates a synchronizing cylinder to synchronize the action of the hydraulic cylinders 24. The synchronizing cylinder, indicated generally by the reference numeral 54, has an enclosed housing 56 that is divided by a central member 58 into two chambers 60 and 62. A first piston 64 is moveable in chamber 60 while a second piston 66 is moveable in chamber 62. Each of the pistons 64 and 66 contain a synchronizing valve 68 and 70 respectively, and pistons 64 and 66 are interconnected by a connecting rod 72 which has a passageway 74 that allows fluid to flow from chamber 60 to chamber 62. Fluid under pressure is introduced into the synchronizing cylinder through an inlet line 76, and the fluid flows to one of the hydraulic cylinders 24 through fluid line 78 while fluid to the other hydraulic cylinder 24 flows from the synchronizing cylinder 54 through line 80. In addition, fluid to the other end of each hydraulic cylinder 24 flows through lines 82 and 84 which are connected to the pump assembly (not shown) through line 86. A first solenoid 88 controls the flow of fluid to one side of the hydraulic cylinders 24 so as to extend the operating rods 28 while a second solenoid 90 controls flow to retract the operating rods 28. The valve assembly just describes is connected to the hydraulic pump in the closed system through a pressure inlet 100 and a return line 102. With the foregoing described system, an equal volume of fluid under pressure is always supplied to each of the hydraulic cylinders 24. This assures that the cylinders 24 will always operate in synchronization. However, if one side of the system should become jammed and a cylinder 24 not move, the system will automatically shut down the other cylinder 24 to prevent damage to the mechanism The system shown in FIG. 11 also includes manually actuated T-handles 104 and 106 so that the solenoids 88 and 90 can be manually operated in the event of a failure of the solenoids 88 or 90 to operate.

From the foregoing described system, it will be evident that there is provided a system and mechanism for smoothly and efficiently extending and retracting an expandable room and lowering the floor so that when the room is fully extended the floor of the extended room will be level with the fixed floor. By tying the two hydraulic cylinders together with a synchronizing cylinder, smooth, even extension and retraction of the room is provided, thus eliminating the need for any mechanical means of tying the mechanisms together. This leaves the space between the floors available for storage. Because of the precise movement of the room during both retraction and extension, the floor will be extended and dropped to a level position without any damage to any of the sealing components around the opening through which the expandable room extends, thus preserving the integrity of the weather seals over time. The system of the invention at is relatively simple and inexpensive to produce but is very reliable. The number and size of components are kept to a minimum making the system very appealing to purchasers.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is as follows:

1. A system for use with an enclosed space comprising, in combination a frame structure supporting outer walls and a stationary floor so as to expand the useable space by moving an expandable room outwardly, a first support beam affixed to the frame structure to support the expandable room, the first support beam being positioned beneath the stationary floor, a second support beam affixed to the frame structure to support the expandable room, the second support beam being spaced apart from the first support beam and extending parallel to the first support beam, the first and second support beams being spaced apart a distance less than the width of the expandable room, an outer tube supported by each of the support beams and movable relative to the support beam, an inner tube supported inside of the outer tube and movable relative to the outer tube, a hydraulic cylinder operatively connected to the inner tube to extend and retract the inner tube, a movable floor that forms a part of the expandable room affixed to the inner tubes for movement from a retracted position to an extended position, the movable floor being supported on the stationary floor when in the retracted position, a secondary floor support fixed to the outer tube and positioned to engage and support the movable floor as it moves from the retracted position to the extended position, a rail assembly supported by the frame structure supporting the outer tubes as they move from the retracted position to the extended position, the rail assembly including a ramp to provide for lowering of the outer tubes and inner tubes when the movable floor becomes disengaged from the stationary floor, and moveable locking catches selectively locking the outer tube to the rail assembly when the inner tube is retracted and locking the inner tubes and outer tubes when the inner tube is fully extended.

2. The system of claim 1 in which the secondary floor support supports the movable floor at the same level as the stationary floor when the inner tube is fully extended.

3. The system of claim 2 in which the hydraulic cylinders are pivotally connected to the respective ones of the first and second support beams to provide for pivotal movement of each hydraulic cylinder upwardly and downwardly as the inner tubes are extended and retracted.

4. The system of claim 3 in which bearings are combined with each outer tube, the bearings being engageable with the ramp.

5. The system of claim 1 in which the hydraulic cylinders are double acting cylinders with each cylinder having a moveable piston that divides the cylinder into a first and a second chamber, and the hydraulic cylinders are combined in a hydraulic system comprised of:

a synchronizing cylinder having a first chamber and a second chamber; a first piston moveable in the first chamber of the synchronizing cylinder and a second piston moveable in the second chamber of the synchronizing cylinder; a connecting rod having a passageway extending through it interconnecting the first and second pistons of the synchronizing cylinder and providing for the flow of hydraulic fluid between the first and second chambers of the synchronizing cylinder; a synchronizing valve in each of the first and second pistons of the synchronizing cylinder;

an inlet combined with the synchronizing cylinder to provide for the flow of hydraulic fluid into the first and second chambers of the synchronizing cylinder;

a first fluid line connecting the second chambers of each of the hydraulic cylinders;

a second fluid line connecting the second chamber of the synchronizing cylinder with the first chamber of one of the hydraulic cylinders and a third fluid line connecting the first chamber of the synchronizing cylinder with the first chamber of the other hydraulic cylinder;

a first solenoid valve operatively connected in the first fluid line;

a second solenoid valve operatively connected to the second chamber of the synchronizing valve;

whereby an equal volume of hydraulic fluid is always supplied to each of the hydraulic cylinders to assure that the cylinders will operate in synchronization.

6. The system of claim 5 in which the first and second solenoid valves are each provided with a manually operable handle so that the solenoids can be manually operated in the event of failure of the solenoids.

* * * * *